United States Patent
Fukuda

(10) Patent No.: US 11,050,362 B2
(45) Date of Patent: Jun. 29, 2021

(54) POWER CONVERSION DEVICE AND ABNORMALITY DETECTION METHOD

(71) Applicant: Mitsubishi Electric Corporation, Tokyo (JP)

(72) Inventor: Yoichi Fukuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/768,122

(22) PCT Filed: Dec. 4, 2017

(86) PCT No.: PCT/JP2017/043462
§ 371 (c)(1),
(2) Date: May 29, 2020

(87) PCT Pub. No.: WO2019/111293
PCT Pub. Date: Jun. 13, 2019

(65) Prior Publication Data
US 2020/0321889 A1    Oct. 8, 2020

(51) Int. Cl.
*H02M 7/539*    (2006.01)
(52) U.S. Cl.
CPC .................. *H02M 7/539* (2013.01)
(58) Field of Classification Search
CPC ........ H02M 7/53; H02M 7/537; H02M 7/539; H02M 7/5395; H02M 7/42; H02M 7/44; H02M 7/48
See application file for complete search history.

(56) References Cited

U.S. PATENT DOCUMENTS

| 2011/0181104 A1* | 7/2011 | Kamaga | B60L 50/61 307/9.1 |
| 2015/0280623 A1* | 10/2015 | Fujie | H02M 1/32 318/400.21 |
| 2016/0065073 A1* | 3/2016 | Katsuki | B60L 15/007 323/271 |
| 2017/0158057 A1 | 6/2017 | Otani | |
| 2019/0229663 A1* | 7/2019 | Ogawa | H02P 21/24 |
| 2019/0245474 A1* | 8/2019 | Gotou | H02P 27/06 |

(Continued)

FOREIGN PATENT DOCUMENTS

| JP | 2008109846 A | 5/2008 |
| JP | 2015139264 A | 7/2015 |
| JP | 2016010180 A | 1/2016 |

OTHER PUBLICATIONS

Office Action dated Dec. 22, 2020, issued in corresponding Indian Patent Application No. 202027022049, 5 pages.

(Continued)

*Primary Examiner* — Adolf D Berhane
(74) *Attorney, Agent, or Firm* — Buchanan Ingersoll & Rooney PC

(57) ABSTRACT

A power conversion device includes a converter and an inverter that form a power converter to convert a first power into a second power, an input-current sensor to measure a first current value that is a current value of the first power, an output-current sensor to measure a second current value that is a current value of the second power, and a control unit to detect an abnormality of the input-current sensor based on the first current value and the second current value.

10 Claims, 5 Drawing Sheets

(56) References Cited

U.S. PATENT DOCUMENTS

2020/0194994 A1* 6/2020 Goto .................. H02H 5/044
2020/0259447 A1* 8/2020 Hoshi ................. H02P 27/085
2020/0273267 A1* 8/2020 Takahashi ........... G07C 5/008

OTHER PUBLICATIONS

International Search Report (PCT/ISA/210) dated Feb. 13, 2018, by the Japan Patent Office as the International Searching Authority for International Application No. PCT/JP2017/043462.
Written Opinion (PCT/ISA/237) dated Feb. 13, 2018, by the Japan Patent Office as the International Searching Authority for International Application No. PCT/JP2017/043462.

* cited by examiner though an example where the power
POWER CONVERSION DEVICE AND ABNORMALITY DETECTION METHOD

FIELD

The present invention relates to a power conversion device that converts an input power into a desired power and outputs the power, and to an abnormality detection method.

BACKGROUND

Conventionally, there is known a power conversion device that converts an input power into a desired power and outputs the converted power to a load. For example, a power conversion device described in Patent Literature 1 is mounted on a railway vehicle, converts a direct-current power input from an overhead wire into an alternating-current power after boosting the direct-current power to a desired voltage, insulates the alternating-current power by using a transformer, converts the alternating-current power into a direct-current power, and then outputs the direct-current power to a load. The power conversion device described in Patent Literature 1 detects an overcurrent caused by a load short-circuit or the like, by a measuring instrument that measures a current value of a direct-current power output to a load; however, the power conversion device cannot detect the overcurrent when the measuring instrument malfunctions. Therefore, when detecting a malfunction of the measuring instrument, the power conversion device described in Patent Literature 1 stops its power conversion operation to protect internal circuits of the power conversion device from an overcurrent that cannot be detected when it is generated.

CITATION LIST

Patent Literature

Japanese Patent Application Laid-open No. 2015-139264

SUMMARY

Technical Problem

However, in the conventional technique described above, the power conversion device cannot detect an abnormality of the measuring instrument that measures a current value of a power input to the power conversion device. The power conversion device has a problem of, in a case where the measuring instrument that measures an input current value is in an abnormal state, not being able to detect an overcurrent of the input power and to protect the internal circuits of the power conversion device.

The present invention has been achieved in view of the above problems, and an object of the present invention is to provide a power conversion device that can detect an abnormality of a measuring instrument that measures an input current value.

Solution to Problem

In order to solve the above-described problem and achieve the object, a power conversion device of the present invention includes a power converter to convert a first power into a second power, a first current measurement unit to measure a first current value that is a current value of the first power, a second current measurement unit to measure a second current value that is a current value of the second power, and a control unit to detect an abnormality of the first current measurement unit based on the first current value and the second current value.

Advantageous Effects of Invention

According to the present invention, the power conversion device has an effect where it is possible to detect an abnormality of a measuring instrument that measures an input current value.

DESCRIPTION OF EMBODIMENTS

A power conversion device and an abnormality detection method according to embodiments of the present invention will be described in detail below with reference to the accompanying drawings. The present invention is not limited to the embodiments.

Embodiment

Figure 1:
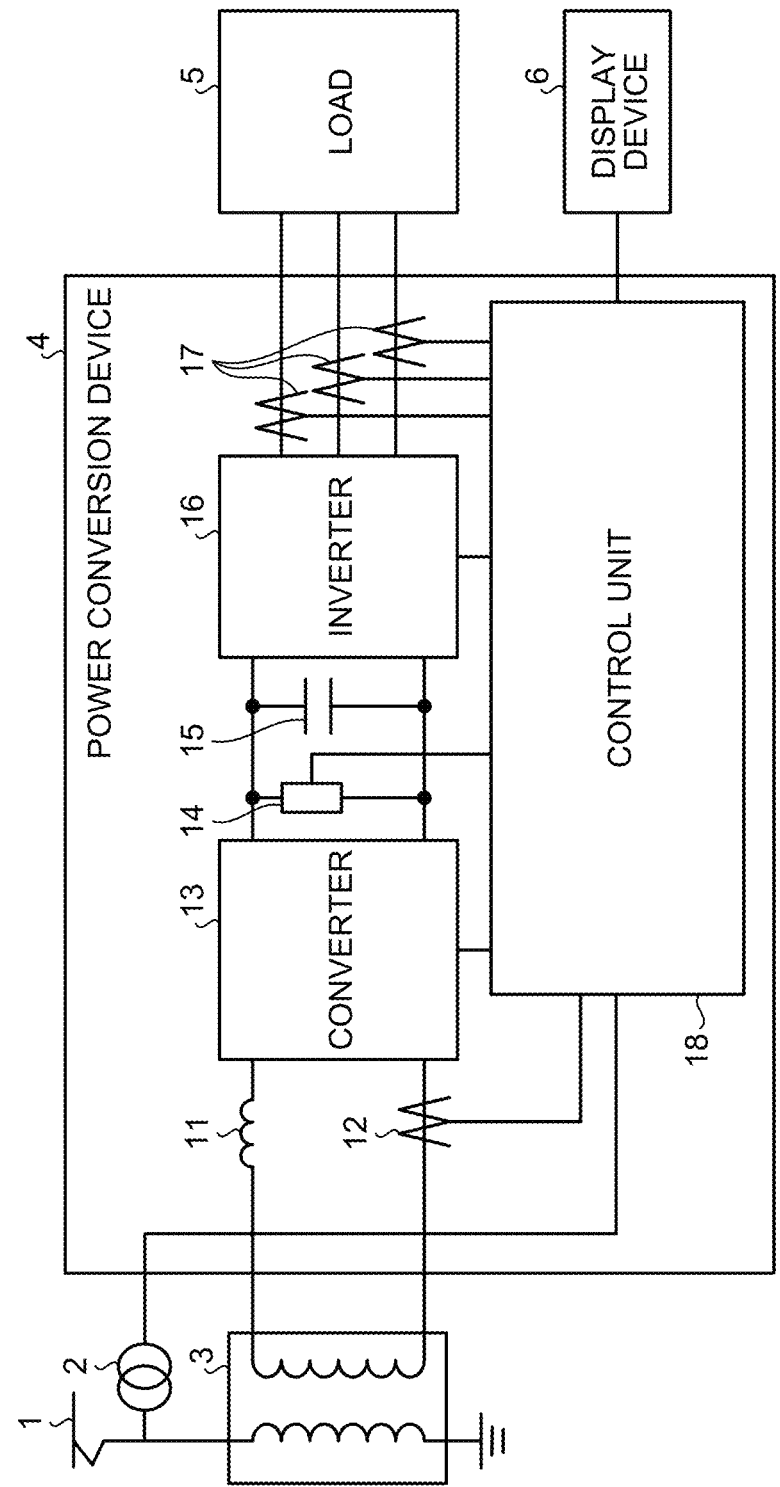
FIG. 1 is a diagram illustrating a configuration example of a power conversion device.

FIG. 1 is a diagram illustrating a configuration example of a power conversion device 4 according to an embodiment of the present invention. While an example where the power conversion device 4 is mounted on a railway vehicle (not illustrated) is described below, it is merely an example, and the power conversion device 4 may be mounted on a vehicle other than a railway vehicle. The power conversion device 4 is connected to an overhead-wire voltage sensor 2, a main transformer 3, a load 5, and a display device 6. The overhead-wire voltage sensor 2, the main transformer 3, the load 5, and the display device 6 are also mounted on the railway vehicle. An alternating-current overhead wire 1 supplies an alternating-current power supplied from a substation (not illustrated) to the main transformer 3. The overhead-wire voltage sensor 2 is a measuring instrument that measures an alternating-current voltage value of the alternating-current power supplied from the alternating-current overhead wire 1 to the main transformer 3, that is, an overhead-wire voltage value. The main transformer 3 converts an overhead-wire voltage of the alternating-current power supplied from the alternating-current overhead wire 1 into a voltage at a level at which the voltage can be used by the power conversion device 4. A first alternating-current power that is an alternating-current power having been voltage-converted in the main transformer 3 is input to the power conversion device 4 as an input power.

The power conversion device 4 outputs a second alternating-current power that is a three-phase alternating-current power having been converted from a direct-current power in an inverter 16 described later to the load 5 as an output power. That is, the power conversion device 4 converts the first alternating-current power input thereto into the second alternating-current power and outputs the second alternating-current power. The load 5 is an electrical device mounted on the railway vehicle. The load 5 is, for example, a motor, an air conditioner, or a compressor. When a control unit 18 of the power conversion device 4 described later has detected an abnormality of an input-current sensor 12, the display device 6 displays that, under control of the control unit 18, the input-current sensor 12 is abnormal. The display device 6 is a monitor installed in a cab of the railway vehicle, for example.

The configuration of the power conversion device 4 is described. The power conversion device 4 includes a filter reactor 11, the input-current sensor 12, a converter 13, a direct-current voltage sensor 14, a filter capacitor 15, the inverter 16, an output-current sensor 17, and the control unit 18.

The filter reactor 11 constitutes a filter circuit along with the filter capacitor 15, and reduces a rapid current change in the first alternating-current power. The input-current sensor 12 is a measuring instrument that measures a first current value that is a current value of the first alternating-current power input from the main transformer 3 to the power conversion device 4. The input-current sensor 12 is a first current measurement unit. The converter 13 converts the first alternating-current power input from the main transformer 3 to the power conversion device 4 into a direct-current power. The configuration of the converter 13 may be a general one and it is not limited to any specific configuration. The direct-current voltage sensor 14 is a measuring instrument that measures a direct-current voltage value of the direct-current power output from the converter 13. The filter capacitor 15 removes harmonic components generated in power conversion processing performed by the converter 13 and the inverter 16 from the direct-current power. Further, the filter capacitor 15 is charged by the direct-current power output from the converter 13.

The inverter 16 converts a direct-current power that is output from the converter 13 and with which the filter capacitor 15 is charged into the second alternating-current power. The configuration of the inverter 16 may be a general one and it is not limited to any specific configuration. Here, the second alternating-current power output from the inverter 16 is assumed to be a three-phase alternating-current power. The output-current sensor 17 is a measuring instrument that measures a second current value that is a current value of the second alternating-current power of each phase output from the inverter 16. The output-current sensor 17 is a second current measurement unit. It is assumed that the converter 13 and the inverter 16 collectively constitute a power converter. The control unit 18 controls operations of the converter 13 and the inverter 16 that constitute the power converter. The control unit 18 also detects an abnormality of the input-current sensor 12 based on the first current value that is a measurement result of the input-current sensor 12 and the second current value that is a measurement result of the output-current sensor 17. In the power conversion device 4, configurations other than the configuration of the control unit 18 are identical to configurations used in a general power conversion device.

Figure 2:
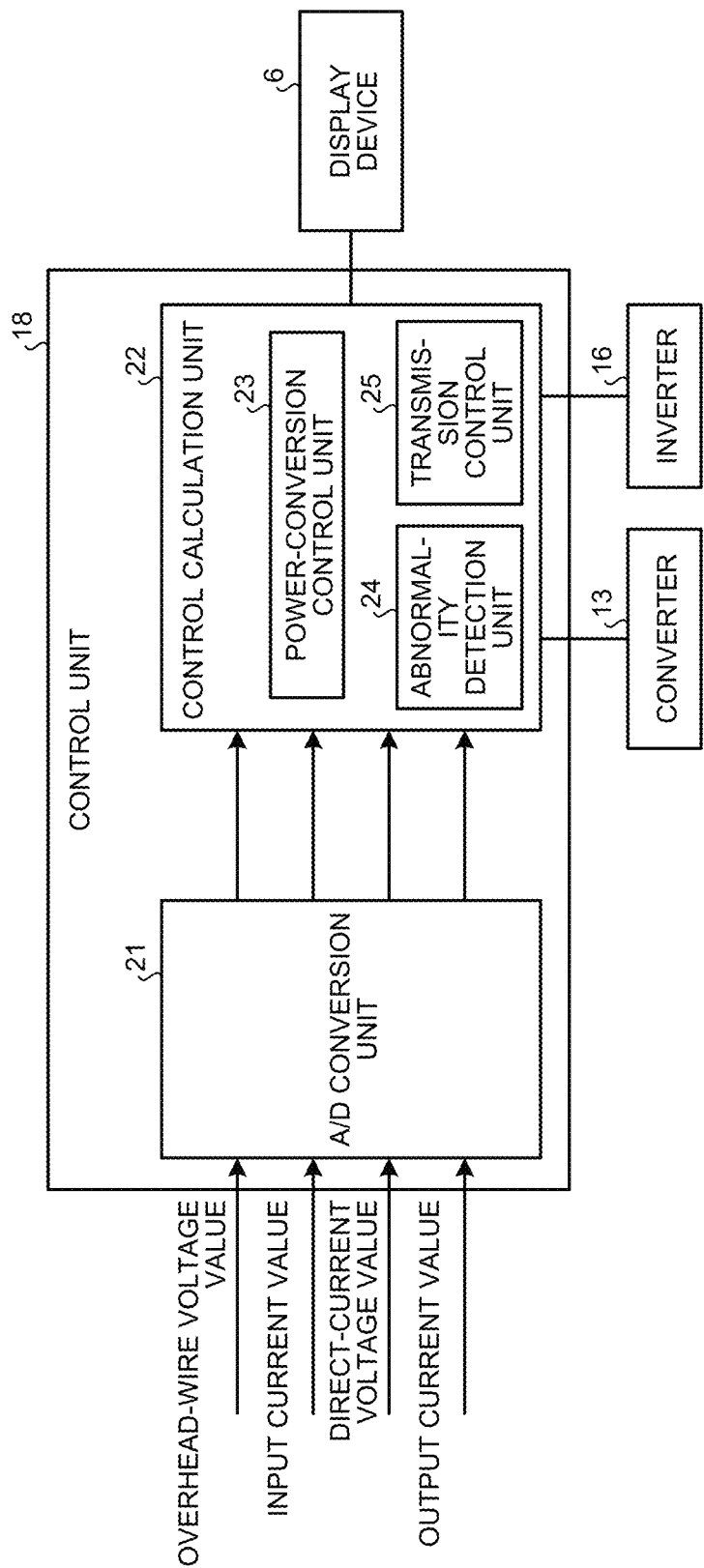
FIG. 2 is a diagram illustrating a configuration example of a control unit.

The configuration of the control unit 18 is described. FIG. 2 is a diagram illustrating a configuration example of the control unit 18 according to the present embodiment. The control unit 18 includes an A/D (Analog/Digital) conversion unit 21 and a control calculation unit 22.

The A/D conversion unit 21 converts a measured value obtained by measurement of each sensor from an analog value into a digital value. Specifically, the A/D conversion unit 21 converts each of the measured values, which are an overhead-wire voltage value measured by the overhead-wire voltage sensor 2, an input current value measured by the input-current sensor 12, a direct-current voltage value measured by the direct-current voltage sensor 14, and an output current value measured by the output-current sensor 17 from an analog value, into a digital value. While the output current value is represented with a single line in FIG. 2, in practice, output current values for three phases are input to the A/D conversion unit 21 as illustrated in FIG. 1. Similarly, as for the output current value output from the A/D conversion unit 21 to the control calculation unit 22, in practice, output current values for three phases are output from the A/D conversion unit 21.

The control calculation unit 22 acquires each measured value having been converted into a digital value from the A/D conversion unit 21, and controls operations of the power conversion device 4 based on each measured value. The control calculation unit 22 includes a power-conversion control unit 23, an abnormality detection unit 24, and a transmission control unit 25.

The power-conversion control unit 23 controls operations of the converter 13 and the inverter 16 by using the overhead-wire voltage value, the input current value, the direct-current voltage value, and the output current value acquired from the A/D conversion unit 21. The power-conversion control unit 23 monitors the state of an alternating-current power supplied from the alternating-current overhead wire 1, more specifically, the phase and amplitude of an alternating-current voltage by using the overhead-wire voltage value, and uses the monitored state for control of the converter 13 and the inverter 16. The power-conversion control unit 23 calculates a target current value of the input current value based on the output current value in such a manner that an appropriate amount of a direct-current power is input from the converter 13 to the inverter 16 with respect to the amount of an alternating-current power output from the inverter 16. The power-conversion control unit 23 may calculate the target current value of the input current value based on the direct-current voltage value and the output current value. The power-conversion control unit 23 controls the operation of the converter 13 in such a manner that the input current value becomes the target current value. The method of controlling the converter 13 and the inverter 16 by the power-conversion control unit 23 may be a general one and it is not limited to any specific method. In a case where the converter 13 and the inverter 16 each include a switching element, for example, the power-conversion control unit 23 controls the operation of the switching element included in each of the converter 13 and the inverter 16.

The abnormality detection unit 24 detects an abnormality of the input-current sensor 12 based on the input current value and the output current value acquired from the A/D conversion unit 21. Detailed operations of the abnormality detection unit 24 are described later.

When an abnormality of the input-current sensor 12 is detected in the abnormality detection unit 24, the transmission control unit 25 notifies the display device 6 that the input-current sensor 12 is abnormal. The transmission control unit 25 causes the display device 6 to display that the input-current sensor 12 is abnormal.

Figure 3:
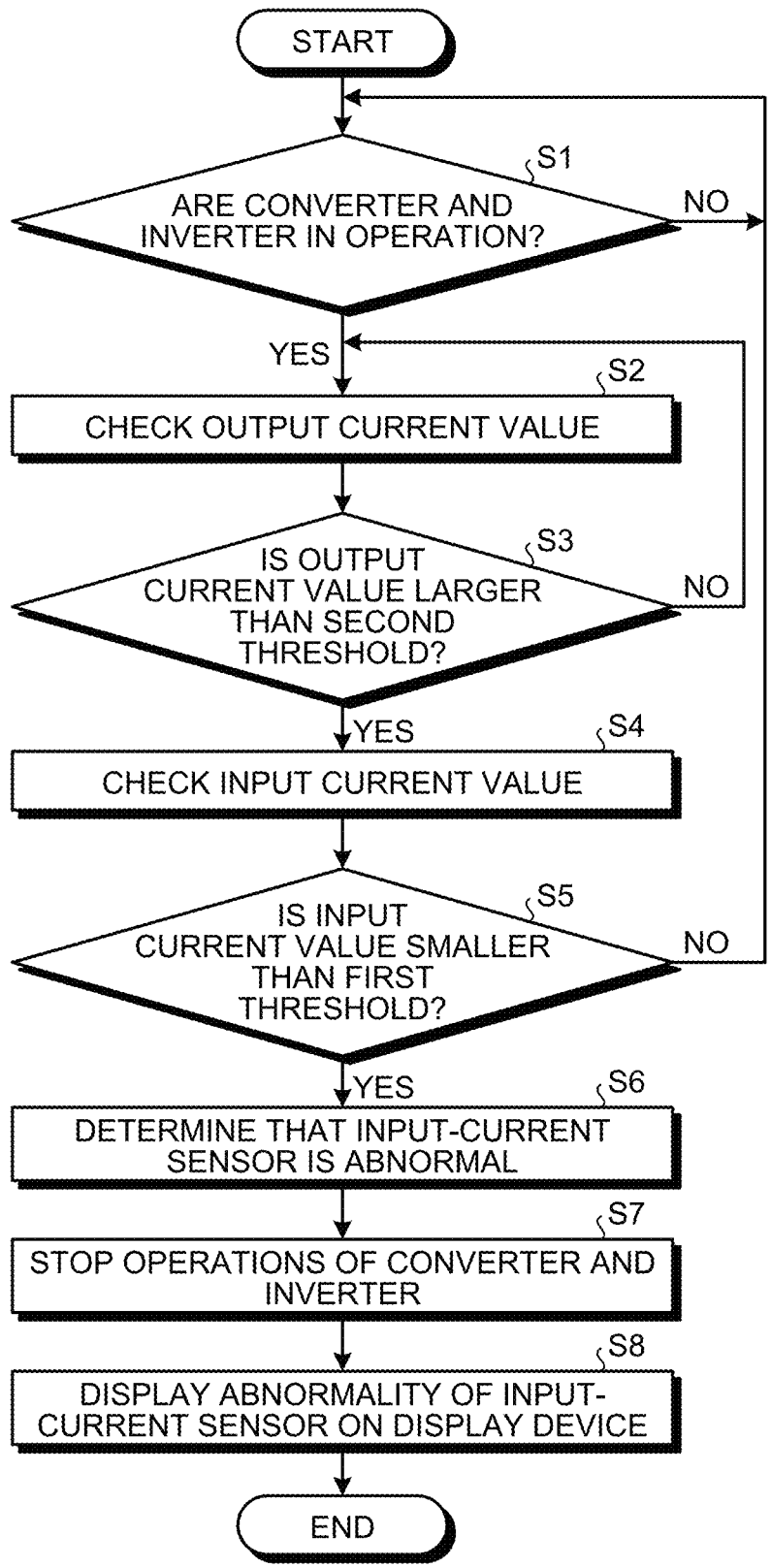
FIG. 3 is a flowchart illustrating an operation where the control unit detects an abnormality of an input-current sensor.

Next, there is described an operation of the power conversion device 4, in which the control unit 18 detects an abnormality of the input-current sensor 12. FIG. 3 is a flowchart illustrating an operation where the control unit 18 according to the present embodiment detects an abnormality of the input-current sensor 12. As for a first threshold used in a determination process in the operation illustrated in FIG. 3, it is permissible that the abnormality detection unit 24 receives a parameter from a user in advance, or calculates the parameter during the operation. As for a second threshold, the abnormality detection unit 24 receives a parameter from a user in advance. Details of the first and second thresholds are described later in detail.

First, in the control unit 18, the abnormality detection unit 24 determines whether the converter 13 and the inverter 16 are in operation (Step S1). In general, when the converter 13 and the inverter 16 are in operation, a control signal is input from the power-conversion control unit 23 to the converter 13 and the inverter 16. The abnormality detection unit 24 can determine whether the converter 13 and the inverter 16 are in operation based on the presence of the control signal from the power-conversion control unit 23 to the converter 13 and the inverter 16. Further, the abnormality detection unit 24 may determine whether the converter 13 and the inverter 16 are in operation based on the contents of an operation instruction output from a cab (not illustrated) in a railway vehicle to the control unit 18. When the converter 13 and the inverter 16 are not in operation (NO at Step S1), the abnormality detection unit 24 returns to the process at Step S1. When the converter 13 and the inverter 16 are in operation (YES at Step S1), the abnormality detection unit 24 checks an output current value acquired from the A/D conversion unit 21 (Step S2).

The abnormality detection unit 24 determines whether the acquired output current value exceeds the set second threshold (Step S3). The second threshold is a value for determining whether the second alternating-current power is output from the inverter 16 to the load 5. The second threshold is a fixed value larger than "0" set by a user or the like in advance. For example, the user sets the second threshold based on the measurement accuracy of the output-current sensor 17, while taking measurement errors or the like into consideration. The abnormality detection unit 24 compares each of the acquired output current values for three phases and the second threshold with each other. When there is no output current value exceeding the second threshold (NO at Step S3), the abnormality detection unit 24 returns to the process at Step S2. When it is NO at Step S3, it means that the second alternating-current power is not output to the load 5. Therefore, the load 5 is not in operation. When there is one or more output current values exceeding the second threshold (YES at Step S3), the abnormality detection unit 24 checks an input current value acquired from the A/D conversion unit 21 (Step S4).

The abnormality detection unit 24 determines whether the acquired input current value is smaller than the set first threshold (Step S5). The first threshold is a value for determining whether the first alternating-current power is input from the main transformer 3 to the converter 13. The first threshold may be a fixed value set in advance by a user or the like, or may be a calculated value set by the abnormality detection unit 24 based on calculation. The abnormality detection unit 24 calculates a value that is in proportion to the magnitude of the output current value or a target current value calculated in the power-conversion control unit 23, based on the output current value or the target current value and sets the calculated value as the first threshold. Accordingly, the abnormality detection unit 24 can set the first threshold in accordance with the magnitude of the output current value, so that it is possible to improve the determination accuracy at Step S5 as compared with a case where the first threshold is a fixed value. When calculating the first threshold, the abnormality detection unit 24 may use the latest output current value or the target current value based on the latest output current value. Further, because the control unit 18 repeats the operation in the flowchart illustrated in FIG. 3, when calculating the first threshold, the abnormality detection unit 24 may use the output current value or the target current value acquired in the previous operation. In a case where the input current value becomes a certain constant value when the input-current sensor 12 is abnormal, setting the first threshold to a fixed value can reduce the processing load of the abnormality detection unit 24 as compared with a case where the first threshold is a calculated value.

When the input current value is equal to or larger than the first threshold (NO at Step S5), the abnormality detection unit 24 returns to the process at Step S1. When it is NO at Step S5, the input-current sensor 12 is in a normal state. When the input current value is smaller than the first threshold (YES at Step S5), the abnormality detection unit 24 determines that the input-current sensor 12 is abnormal (Step S6). Upon detection of an abnormality of the input-current sensor 12, the abnormality detection unit 24 notifies the power-conversion control unit 23 and the transmission control unit 25 that the input-current sensor 12 is abnormal.

When the abnormality detection unit 24 detects an abnormality of the input-current sensor 12, the power-conversion control unit 23 receives a notification from the abnormality detection unit 24 and stops operations of the converter 13 and the inverter 16 (Step S7). When the abnormality detection unit 24 detects an abnormality of the input-current sensor 12, the transmission control unit 25 receives the notification from the abnormality detection unit 24 and notifies the display device 6 connected to the power conversion device 4 that the input-current sensor 12 is abnormal. The transmission control unit 25 causes the display device 6 to display that the input-current sensor 12 is abnormal (Step S8). The contents displayed on the display device 6 may be a message indicating that the input-current sensor 12 is abnormal or an error code.

A user can recognize that, by confirming the displayed contents on the display device 6, the cause of stopping the operations of the converter 13 and the inverter 16 is an abnormality of the input-current sensor 12. The control unit 18 repeats the operation in the flowchart illustrated in FIG. 3.

A hardware configuration of the power conversion device 4 is described next. As described above, in the power conversion device 4, configurations other than the configuration of the control unit 18 are identical to configurations used in a general power conversion device. The control unit 18 is realized by a processing circuit. That is, the power conversion device 4 includes a processing circuit that can detect an abnormality of the input-current sensor 12. The processing circuit may be a processor that executes a program stored in a memory and the memory, or may be dedicated hardware.

Figure 4:
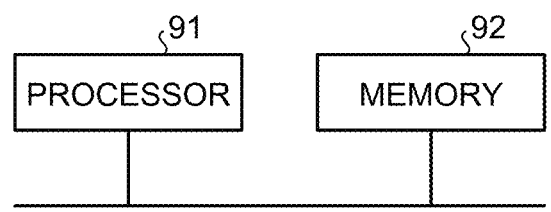
FIG. 4 is a diagram illustrating an example of a case where a processing circuit included in the power conversion device is constituted by a processor and a memory.

FIG. 4 is a diagram illustrating an example of a case where a processing circuit included in the power conversion device 4 according to the present embodiment is constituted by a processor and a memory. In a case where the processing circuit is constituted by a processor 91 and a memory 92, functions of the processing circuit of the power conversion device 4 are realized by software, firmware, or a combination of software and firmware. The software or the firmware is described as a program and is stored in the memory 92. The processing circuit realizes the functions thereof by reading and executing the program stored in the memory 92 by the processor 91. That is, the processing circuit includes the memory 92 that stores therein a program that causes detection of an abnormality of the input-current sensor 12 to be consequently performed. Further, such programs can be considered as elements that cause a computer to perform the procedures and method of the power conversion device 4.

The processor 91 may be a device such as a CPU (Central Processing Unit), a processing device, an arithmetic device, a microprocessor, a microcomputer, or a DSP (Digital Signal Processor). The memory 92 corresponds to, for example, a nonvolatile or volatile semiconductor memory such as a RAM (Random Access Memory), a ROM (Read Only Memory), a flash memory, an EPROM (Erasable Programmable ROM), and an EEPROM® (Electrically EPROM), or a device such as a magnetic disk, a flexible disk, an optical disk, a compact disk, a MiniDisk, and a DVD (Digital Versatile Disk).

Figure 5:
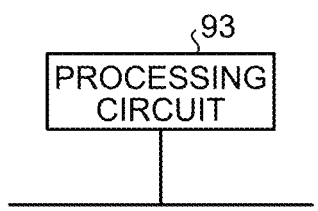
FIG. 5 is a diagram illustrating an example of a case where a processing circuit included in the power conversion device is constituted by dedicated hardware.

FIG. 5 is a diagram illustrating an example of a case where a processing circuit included in the power conversion device 4 according to the present embodiment is constituted by dedicated hardware. When the processing circuit is constituted by dedicated hardware, a processing circuit 93 illustrated in FIG. 5 corresponds to, for example, a single circuit, a composite circuit, a programmed processor, a parallel-programmed processor, an ASIC (Application Specific Integrated Circuit), an FPGA (Field Programmable Gate Array), or a combination of these elements. Each of the functions of the power conversion device 4 may be realized by the processing circuit 93 for each function, or these functions may be collectively realized by the processing circuit 93.

As for the respective functions of the power conversion device 4, it is possible to configure that some parts of the functions are realized by dedicated hardware and other parts thereof are realized by software or firmware. In this manner, the processing circuit can realize each function described above by dedicated hardware, software, firmware, or a combinations of these elements.

Normally, the control unit 18 executes control in such a manner that an input current value becomes a target current value. Therefore, in a case where an abnormality occurs in the input-current sensor 12 and the input current value is smaller than the target current value, the control unit 18 increases the target current value to increase the input current value, so that there is a possibility that an input overcurrent is generated. According to the present embodiment, as described above, in the power conversion device 4, when an output current value of an alternating-current power output from the inverter 16 is larger than the second threshold and an input current value of an alternating-current power input to the converter 13 is smaller than the first threshold, the control unit 18 determines that the input-current sensor 12 having measured the input current value is abnormal. Upon detection of an abnormality of the input-current sensor 12, the control unit 18 stops operations of the converter 13 and the inverter 16 because the control unit 18 cannot accurately control the converter 13 and the inverter 16. Accordingly, in the power conversion device 4 according to the present embodiment, it is possible to prevent an input overcurrent from being input to the converter 13, thereby protecting internal parts of the power conversion device 4. Further, the control unit 18 causes the display device 6 to display that the input-current sensor 12 is abnormal. A user who has confirmed the contents of the display device 6 can recognize the cause of stopping the operations of the converter 13 and the inverter 16.

Figure 6:
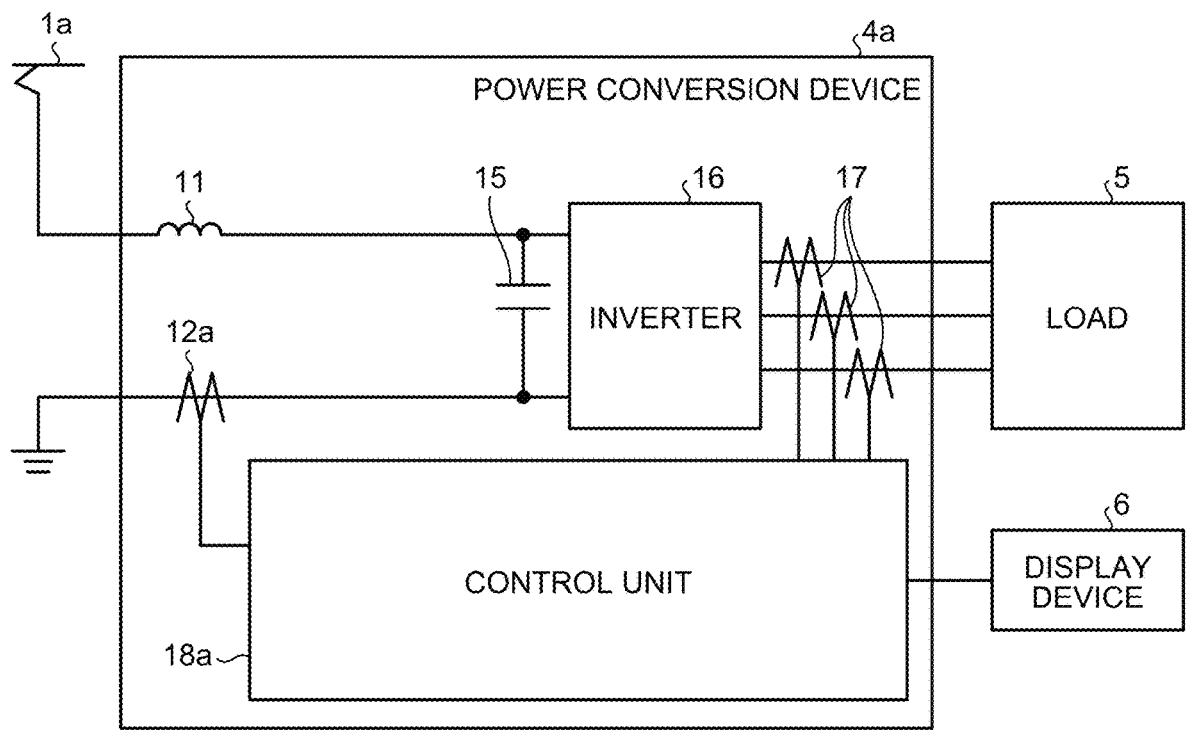
FIG. 6 is a diagram illustrating a configuration example of a power conversion device to which a direct-current power is supplied.

While a case in which an alternating-current power is supplied to a railway vehicle from the alternating-current overhead wire 1 has been described in the present embodiment, this case is merely an example and the application of the present invention is not limited thereto. For example, the present invention can be also applied to a case where a direct-current power is supplied from a direct-current overhead wire to a railway vehicle. FIG. 6 is a diagram illustrating a configuration example of a power conversion device 4a according to the present embodiment to which a direct-current power is supplied. The power conversion device 4a is the power conversion device 4 illustrated in FIG. 1 in which the input-current sensor 12, the converter 13, the direct-current voltage sensor 14, and the control unit 18 are omitted therefrom and an input-current sensor 12a and a control unit 18a are added thereto. In the power conversion device 4a, the input-current sensor 12a measures a current value of a direct-current power supplied from a direct-current overhead wire 1a, that is, a direct current value as an input current value. The control unit 18a detects an abnormality of the input-current sensor 12a based on the first current value that is a measurement result of the input-current sensor 12a and the second current value that is a measurement result of the output-current sensor 17. The contents of the processing performed by the control unit 18a are similar to the contents of the processing performed by the control unit 18, and thus descriptions of detailed configurations and operations of the control unit 18a are omitted. The direct-current power input to the power conversion device 4a may be a direct-current power after the voltage of the direct-current power supplied from the direct-current overhead wire 1a is converted. The power conversion device 4a converts the direct-current power input thereto into an alternating-current power and outputs the alternating-current power. That is, the present invention can be applied to a power conversion device that converts a first power input thereto into a second power and outputs the second power. The first power may be the first alternating-current power described above or a direct-current power. The second power is the second alternating-current power described above. The power conversion device can detect an abnormality of an input-current sensor that measures an input current value, that is, a direct current value by using an output current value and the input current value.

The configurations described in the above embodiment are only examples of the content of the present invention. The configurations can be combined with other well-known techniques, and part of each of the configurations can be omitted or modified without departing from the scope of the present invention.

REFERENCE SIGNS LIST 1 alternating-current overhead wire, 1a direct-current overhead wire, 2 overhead-wire voltage sensor, 3 main transformer, 4, 4a power conversion device, 5 load, display device, 11 filter reactor, 12, 12a input-current sensor, 13 converter, 14 direct-current voltage sensor, 15 filter capacitor, 16 inverter, 17 output-current sensor, 18, 18a control unit, 21 A/D conversion unit, 22 control calculation unit, 23 power-conversion control unit, 24 abnormality detection unit, 25 transmission control unit.

The invention claimed is:

1. A power conversion device comprising:
a power converter to convert a first power into a second power;
a first current measurement circuitry to measure a first current value that is a current value of the first power;
a second current measurement circuitry to measure a second current value that is a current value of the second power; and
a control circuitry to detect an abnormality of the first current measurement unit based on the first current value and the second current value,
wherein the control circuitry determines that the first current measurement circuitry is abnormal when the first current value is smaller than a first threshold and the second current value is larger than a second threshold.

2. The power conversion device according to claim 1, wherein
the first power is a first alternating-current power and the second power is a second alternating-current power,
the power converter includes
a converter to convert the first alternating-current power into a direct-current power, and
an inverter to convert the direct-current power into the second alternating-current power, and
the control circuitry stops operations of the converter and the inverter when an abnormality of the first current measurement circuitry is detected.

3. The power conversion device according to claim 1, wherein the control circuitry calculates the first threshold based on the second current value.

4. The power conversion device according to claim 1, wherein the first threshold is a fixed value.

5. The power conversion device according to claim 1, wherein the control circuitry causes a monitor connected to the power conversion device to display that the first current measurement circuitry is abnormal when an abnormality of the first current measurement circuitry is detected.

6. An abnormality detection method comprising:
converting a first power into a second power by a power converter;
measuring a first current value that is a current value of the first power by a first current measurement circuitry;
measuring a second current value that is a current value of the second power by a second current measurement circuitry; and
detecting an abnormality of the first current measurement circuitry based on the first current value and the second current value by a control circuitry,
wherein, when detecting the abnormality, the control circuitry determines that the first current measurement circuitry is abnormal when the first current value is smaller than a first threshold and the second current value is larger than a second threshold.

7. The abnormality detection method according to claim 6, wherein
in a case where the first power is a first alternating-current power and the second power is a second alternating-current power, and the power converter includes a converter and an inverter,
when converting the power,
the converter converts the first alternating-current power into a direct-current power and the inverter converts the direct-current power into the second alternating-current power, and
the abnormality detection method further comprises stopping operations of the converter and the inverter when the control circuitry has detected an abnormality of the first current measurement circuitry when detecting the abnormality.

8. The abnormality detection method according to claim 6, wherein when detecting the abnormality, the control circuitry calculates the first threshold based on the second current value.

9. The abnormality detection method according to claim 6, wherein the first threshold is a fixed value.

10. The abnormality detection method according to claim 6, wherein the control circuitry causes a monitor to display that the first current measurement circuitry is abnormal when the first current measurement circuitry is determined to be abnormal.

* * * * *